United States Patent
Khalil et al.

(10) Patent No.: US 7,219,255 B2
(45) Date of Patent: May 15, 2007

(54) FAILSAFE SWITCHING OF INTELLIGENT CONTROLLER METHOD AND DEVICE

(75) Inventors: Nidal Khalil, San Jose, CA (US); Guenter Sifnatsch, Santa Clara, CA (US); Uzi Lev-Ami, Mountain View, CA (US); Ron Hadar, Cupertino, CA (US)

(73) Assignee: MKS Instruments, Inc., Andover, MA (US)

( * ) Notice: Subject to any disclaimer, the term of this patent is extended or adjusted under 35 U.S.C. 154(b) by 413 days.

(21) Appl. No.: 10/948,085

(22) Filed: Sep. 23, 2004

(65) Prior Publication Data

US 2006/0025871 A1   Feb. 2, 2006

Related U.S. Application Data

(60) Provisional application No. 60/591,286, filed on Jul. 27, 2004.

(51) Int. Cl.
*G06F 11/00*   (2006.01)

(52) U.S. Cl. .......................... 714/4; 714/11

(58) Field of Classification Search ............... 714/4, 714/11, 12, 13
See application file for complete search history.

(56) References Cited

U.S. PATENT DOCUMENTS

| | | | |
|---|---|---|---|
| 6,176,733 B1* | 1/2001 | Coile et al. ............... 439/489 |
| 6,397,345 B1* | 5/2002 | Edmonds et al. ............. 714/4 |
| 2002/0156613 A1* | 10/2002 | Geng et al. .................. 703/23 |
| 2003/0145117 A1* | 7/2003 | Bhat ........................ 709/249 |
| 2003/0188222 A1* | 10/2003 | Abbondanzio et al. ....... 714/12 |
| 2003/0225916 A1* | 12/2003 | Cheon et al. .............. 709/251 |
| 2003/0225931 A1* | 12/2003 | Cheon et al. .............. 709/321 |
| 2004/0236987 A1* | 11/2004 | Greenspan et al. .......... 714/13 |
| 2005/0270980 A1* | 12/2005 | McGee ....................... 370/238 |
| 2006/0107108 A1* | 5/2006 | Geng et al. ................. 714/11 |
| 2006/0200584 A1* | 9/2006 | Bhat ........................ 709/249 |

* cited by examiner

*Primary Examiner*—Dieu-Minh Le
(74) *Attorney, Agent, or Firm*—Ernest J. Beffel, Jr.; Haynes Beffel & Wolfeld (57) ABSTRACT

The present invention relates to control of and data collection from sensors associated with tools. In particular, it relates to using a controller to mediate communications among a tool, sensors associated with the tool and data users, such as a host system or distributed processors. Particular aspects of the present invention are described in the claims, specification and drawings.

40 Claims, 4 Drawing Sheets

FAILSAFE SWITCHING OF INTELLIGENT CONTROLLER METHOD AND DEVICE

RELATED APPLICATIONS

This application claims the benefit of U.S. Provisional Application No. 60/591,286, entitled "Fail-safe Switching of Intelligent Controller Method and Device," filed 27 Jul. 2004.

This application is related to the commonly owned U.S. patent application Ser. No. 09/935,213 entitled "Method and Apparatus for Monitoring Host to Tool Communications," by inventors Uzi Lev-Ami and Yossef Ilan Reich, filed 22 Aug. 2001; and U.S. patent application Ser. No. 10/819,903, "Controller and Method to Mediate Data Collection from Smart Sensors for Fab Applications" by inventors Uzi Lev-Ami, Guenter Sifnatsch and Mark Attwood, filed 7 Apr. 2004. Those co-pending applications are incorporated by reference as if fully set forth herein.

BACKGROUND OF THE INVENTION

The present invention relates to failsafe operation of controller components introduced between a controller host or first device and a tool or second device. In particular, it relates to establishing a direct connection between the first and second device upon failure of a controller that mediates data transfers between the first and second device. One environment in which this invention is useful is a semiconductor manufacturing fab having a host and tools/sensors, into which an intelligent controller is added between using a controller to mediate communications among a tool, sensors associated with the tool and data users, such as a host system or distributed processors.

Moore's law promises exponential growth in computer power at diminishing prices. This dynamic growth of processing power might lead one to think that semiconductor device manufacturing would be an adventuresome business, like wild-catting for oil. Just the opposite is true. Because manufacturing batches are very valuable and manufacturing processes are sensitive to even small mistakes, semiconductor device manufacturing is a conservative business. Qualification cycles and standards for new equipment and modifications of old equipment are lengthy and demanding. Even a small change is vetted extensively, before being released to production.

Key components used by a fab in semiconductor manufacturing include tools (e.g., deposition chambers, reactors), sensors that monitor the tools (e.g., FTIR sensors, mass spectrographs, thermocouples) and hosts or distributed processors that store and analyze data from the sensors regarding tool operation.

A prior application described a transparent method of listening to data from the sensors and providing it to the hosts or distributed processors using high speed and error-resistant technologies such as TCP/IP over Ethernet. The prior application was by inventors Uzi Lev-Ami and Yossef Ilan Reich, "Method and Apparatus for Monitoring Host to Tool Communications," application Ser. No. 09/935,213, filed on 22 Aug. 2001, which is incorporated by reference. The prior application describes a listening post that could eavesdrop on serial communications from a tool or sensor using an optically isolated connector. Using the eavesdropping approach, one could prove that the fab communications and data collection infrastructure could be upgraded without requiring modification of tools or sensors, at a low risk. The upgrade feasibility could be demonstrated without dismantling the incumbent communications infrastructure.

The next revolution in fab instrumentation and backend analysis capabilities will involve adding intelligent controllers to mediate communications between the tools and sensors, on one side of the controllers, and tool hosts or distributed processors, on the other side, without needing to replace or change the analytical characteristics of the sensors. Increased processor power and decreased storage cost create opportunities for configurations that would not previously have been practical in a fab environment. A second prior application by inventors Uzi Lev-Ami, Guenter Sifnatsch and Mark Attwood, entitled "Controller and Method to Mediate Data Collection from Smart Sensors for Fab Applications", U.S. patent application Ser. No. 10/819, 903 filed on 7 Apr. 2004, describes an intelligent controller with various capabilities.

An opportunity arises to complement the analytical features of an intelligent controller, or any other network attached device that mediates communications between two other devices which are capable of communicating directly, with a failsafe switch that directly links the other devices, if the intermediate device fails or hangs. Better, more reliable and confidence inspiring installations of intermediate devices may result.

SUMMARY OF THE INVENTION

The present invention relates to control of and data collection from sensors associated with tools. In particular, it relates to using a controller to mediate communications among a tool, sensors associated with the tool and data users, such as a host system or distributed processors. Particular aspects of the present invention are described in the claims, specification and drawings.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

Introduction

The SECS message protocols, communication infrastructure and hosting modes used by tools and other automated or semi-automated equipment in semiconductor fabs and foundries developed years ago, when communication and processor speeds were relatively limited. SECS message protocols for fab applications were designed to utilize low-speed, serial communications. These message protocols included structured messages, which could be transmitted quickly even with low-speed communications. Structured messages were and remain difficult to translate and understand. The difficulty is exacerbated when a first message sets a context for a response and a second, responsive message does not repeat the context; that is, the context-sensitive response is only meaningful when paired with the corresponding context-setting message. Communications typically were through RS 232 or equivalent serial communications, along dedicated channels, similar to modems and phone lines for terminals and time-sharing computers. Host systems ran on mainframes, mini computers or work stations. Host systems typically were monolithic, controlling and monitoring all or a substantial set of tools in a fab. Host systems relied on adapters to interface with tools and sensors. Host systems typically received data from the tools and sensors and issued control instructions to the tools. Host systems often received and generated a significant volume of serial communication messages.

The term tool host is used in a broad sense to include both tool control hosts and more limited or flexible distributed processors. Tool hosts include both hosts with comprehensive, integrated tool control functions and hosts that run on distributed processors with more limited, task-specific functions. Tool hosts include products such as Consilium's FAB300 (™) software, which is described as providing a single comprehensive factory management system driven by a centralized definition of customer-specific business processes. This category of tool hosts is designed to replace traditional manufacturing execution systems, which are designed to control tools provided by different vendors. At the opposite end of the tool host spectrum from traditional manufacturing execution systems, component processes may be run on distributed processors to handle a variety of specific functions, without claiming to be comprehensive management systems. Along the spectrum, a product such as Consilium's FAB300 (™) software may be considered a tool control host for some purposes and a process running on a distributed processor, for other purposes.

In the application cited above, a removable listening device was described that could monitor a wired communications channel between one or more tool hosts and one or more tools. The listening device was passive. It optionally could include a standard isolation device to protect the communications channel from noise generated by the listening device. This isolation device could include an optical isolator, a high impedance amplifier or any other components that effectively isolate the wired communications channel from the listening device. The wired communications channel may be an RS 232, RS 422 or CAN-compliant channel, or it may be any of the communications channels previously mentioned.

Controllers and Smart Sensors

The approach disclosed in another prior application uses intelligent controllers and smart, context-aware sensors. An intelligent controller is aware of the status of the tool and/or the workpieces (e.g., wafers or reticles) that the tool is processing. These types of controllers communicate with smart sensors that react to tool and workpiece status information. Instead of depending on reconfiguration instructions as tool and workpiece status changes, the sensors listen for and respond to status changes. They react to the status changes in preprogrammed ways, instead of requiring reconfiguration instructions.

The new intelligent controllers change the operational model for tools, sensors, controllers and data users. Controllers are aware of tool and workpiece status, one way or another. A controller may eavesdrop on or relay instructions that control a tool. Alternatively, the tool may publish its status to the controller. Or, the controller may inquire about the tool's status, either periodically or in response to events that it recognizes as requiring further inquiries. Controllers communicate status information to sensors. The status information may relate to the tool or the workpiece. The sensors are preconfigured to respond to the status information. In response to the status information, the sensors may adopt a data collection plan, calibrate themselves, set an output range, or associate data with the current status information. The controllers communicate data collected from the sensors to data users. The data user may be a traditional tool host running on a mainframe or may be newer software running on distributed processors. The data user may be a monolithic system or confederated packages operating independently or cooperatively. The controllers also may monitor data from the sensors, identify events of interest, and request further data already collected or change the collection plan for the sensors, responsive to the monitored data.

Various Operating Environments

Figure 1:
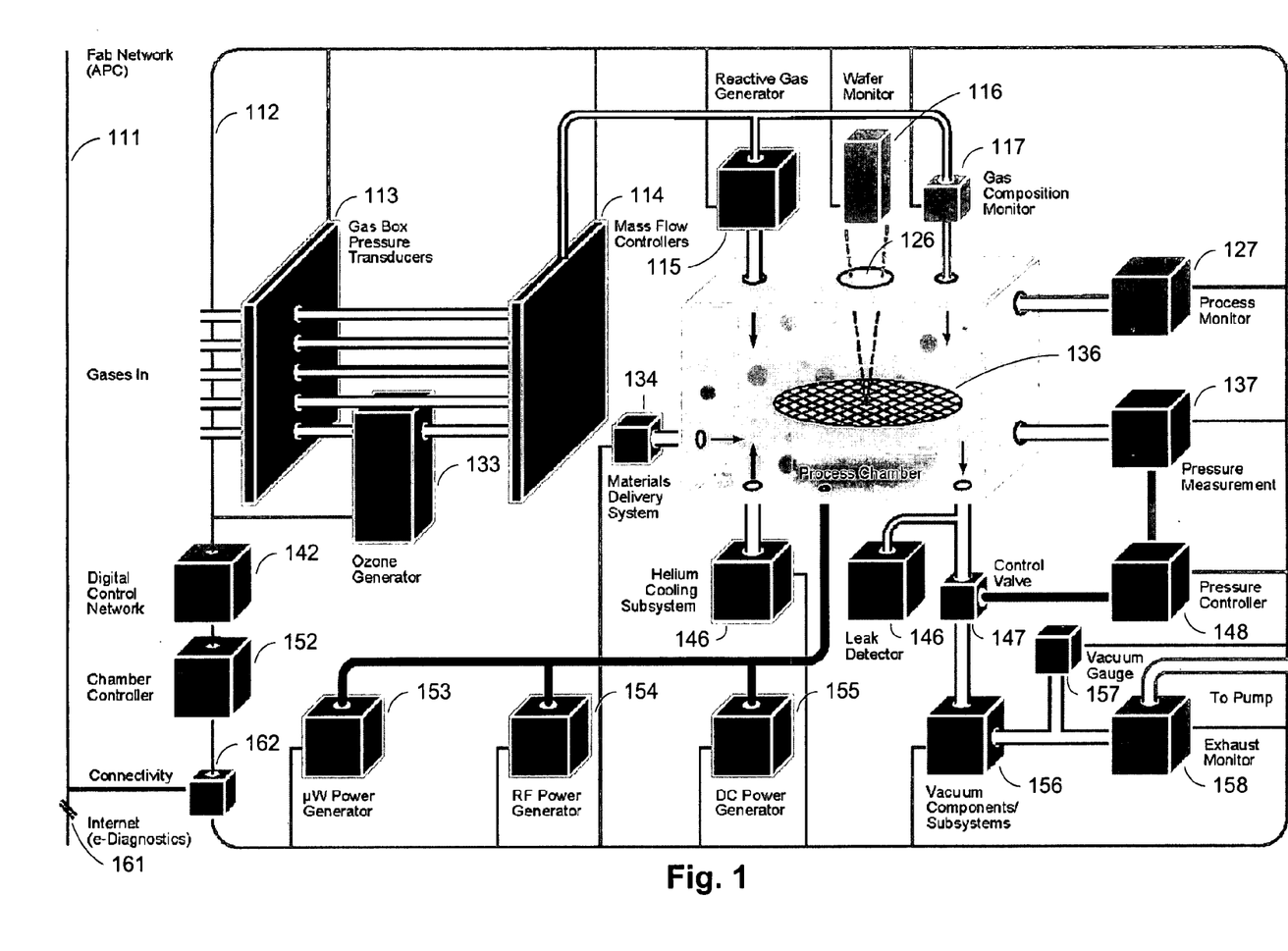
FIG. 1 illustrates an environment in which aspects of the present invention are particularly useful.

FIG. 1 illustrates an environment in which aspects of the present invention are particularly useful. This illustrates a process chamber 125, a variety of inputs to and outputs from the process chamber, plus sensors, control channels and controllers. The chamber 125 may be used for a variety of reactions, such as deposition, cleaning, etching, implantation, ashing, etc. Other types of tools, not illustrated by this figure, also may benefit from aspects of the present invention.

A fab network 111, potentially accessible via the internet, a virtual private network or a wide area network 112 has controlled access through a controller, firewall or other connector 162 to a tool network 112. The tool network in this figure is shown to connect the controls and sensors that impact the process chamber 125 a ring. Those of skill in the art will understand that this architecture is merely illustrative; serial communications, Ethernet or tiered communications are more likely to be used in a fab than a ring.

Gaseous inputs to the reaction chamber 125 include gases that pass through gas box pressure transducers 113 and mass flow controllers (MFCs) 114. Some gas may pass through an ozone generator 133. Other gases and gas mixtures may pas through a reactive gas generator 115 and a gas composition monitor 117. The reactive gas generator 115 may generate plasma, either inside the process chamber 125 or outside it. The gas composition monitor 117 may be in series with or parallel to the reactive gas generator. The mass flow controllers 114 are in gaseous communication with the reactive gas generator 115 and gas composition monitor 117, and ultimately or directly in gaseous communication with the process chamber 125. The gaseous input devices 113, 114, 133, 115 and 117 are in communication with one or more digital controllers 142, chamber controllers 152 and connectivity points 162. This communication typical includes both control and telemetry. These devices may include both controls and sensors that respond to either the operation of the devices or gaseous input and/or output.

Other inputs may include materials delivery 134, a cooling subsystem 145 and various power injectors 153, 154 and 155. The reaction chamber 125 may be a deposition chamber, etcher, thermal processor or other type of reactor. Depending on the type of reaction chamber, the materials delivery system 134 may supply, for instance, materials for deposition on a workpiece 136. The cooling subsystem 145 may help regulate the temperature within the chamber 125, as most chemical reactions will proceed at rates that are temperature sensitive. Power supplied to the chamber may include micro-Watt power 153, RF power 154 used to generate plasma, and DC power 155 used to generate plasma and to heat the chamber or gases or other materials supplied to the chamber. The other inputs, like the gaseous inputs, are in communication with one or more digital controllers 142, chamber controllers 152 and connectivity points 162. This communication typical includes both control and telemetry. These devices may include both controls and sensors that respond to either controlling the operation of the devices or sensing their input and/or output.

Sensors may either respond to the chamber conditions or act on exhaust from the chamber. Sensors that respond to chamber conditions may include a wafer monitor 116 that looks through a window 126 into the chamber 125 to look at film thickness, patterns and other properties (e.g., EPI-Online(™)), a process monitor 127 such an optical emission monitor with an interference filter or interferometer, for etch process control, and a pressure transducer 137. Sensors that act on exhaust from the chamber 125 include a leak detector 146, a vacuum gauge 157 and an exhaust monitor 158. These sensors may interact with a pressure controller 148 and control valve 147, and with vacuum components and/or subsystems 156. They also may interact with a pump and/or an exhaust gas scrubber, which do not appear in the figure. These sensors are in communication with one or more digital controllers 142, chamber controllers 152 and connectivity points 162. This communication typical includes both control and telemetry. The devices in communication with the sensors, e.g., 147, 148 and 156, may include both controls and sensors.

Not illustrated in FIG. 1, a failsafe switch may applied whenever an intermediate device is interposed between a first device or network, such as the fab side network, and second device or network, such as the tool network, that could communicate with each other without the intermediate device. A controller that collects readings from a tool or sensor, stores them and makes them available on request is one example. A controller that supplements data available from a sensor is another example. A controller that converts data from one format, e.g., SECS, to another format, e.g., a tagged XML format, is another. Those of skill in the art will recognized others situations in which failure of an intermediate device might be addressed by failsafe direct connection of the first and second devices or networks.

Controller Deployment and Architecture

Figure 2:
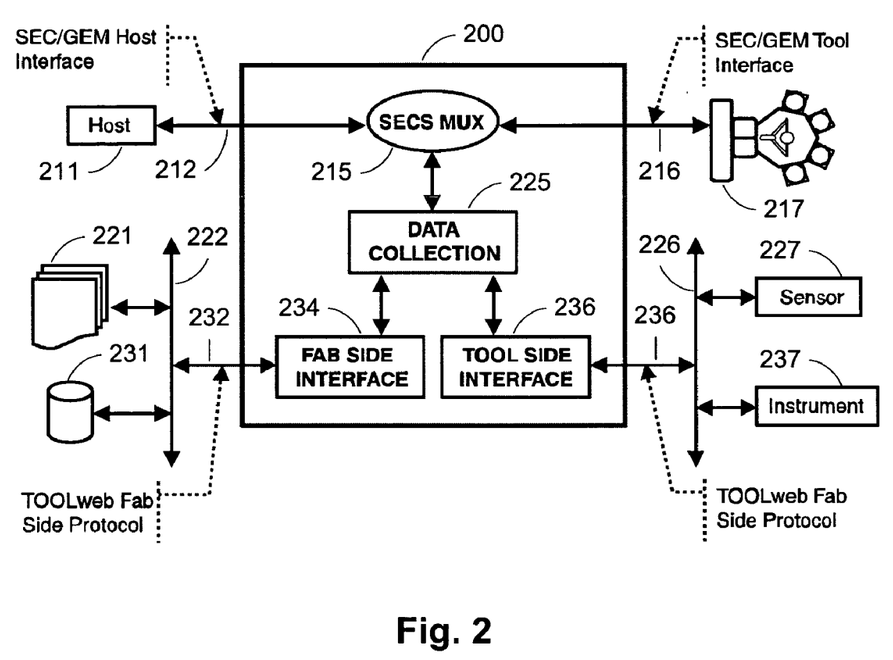
FIG. 2 is a block diagram of a controller in communication with tools, sensors, and a tool host.

FIG. 2 is a block diagram of a controller in communication with tools, sensors, and a tool host. This block diagram could just as well be generalized by identifying the host 211 as a first device, the sensor 227 or instrument 237 as a second device, and the controller 200 as an intermediate device. In the embodiment depicted, the controller 200 configuration includes two SEC/GEM interface ports 212, 216 and two network interface ports 232, 236. The controller includes logic and resources to communicate via the SECS protocol, including a SECS MUX 215. It further includes logic and resources implementing a fab side interface 234 for communicating with data users and a tool side interface 235 for communicating with tools, sensors and instruments. The SECS MUX 215 and interfaces 234, 235 are logically connected to data collection and publishing resources 225. On the fab side of the controller, a traditional tool host 211 may be connected 212 via a SECS compliant communications channel, either SECS-I, HSMS or a subsequent revision of or successor to SECS. In a non-fab environment where this invention might be applied, other protocols could be used to connect with a tool that is being monitored, such as a medical tool or a numerically controlled machine tool. It also may be connected via a fab side protocol distinct from SECS that is carried by a network 222 to storage 231 and reporting 221 resources. On the tool and sensor side of the controller 200, a SEC/GEM tool interface 217 to a tool or tool cluster may be connected 216. The controller also may be connected 236 to a network 226 that hosts sensors 227, instruments 237 and other devices, potentially including tools 217. While this figure illustrates the controller being connected via a network to the sensors, it could alternatively use SECS-I or another, serial-based protocol to connect with sensors.

Figure 3:
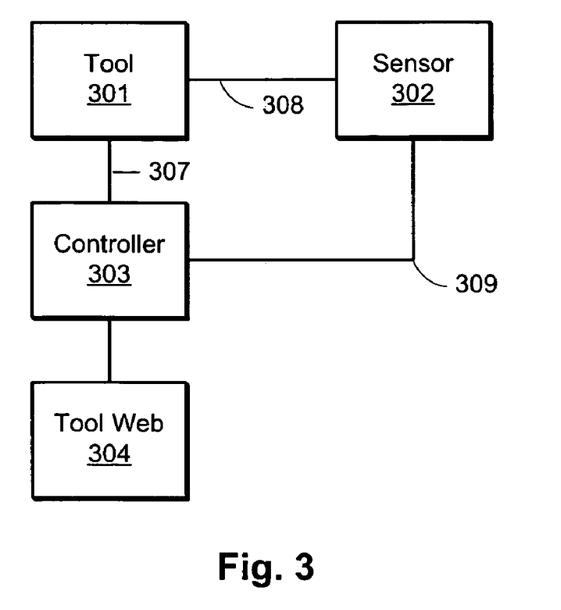
FIG. 3 is a block diagram of a controller using a single type of communication channel to communicate with a tool, sensor, and tool host.
Figure 4:
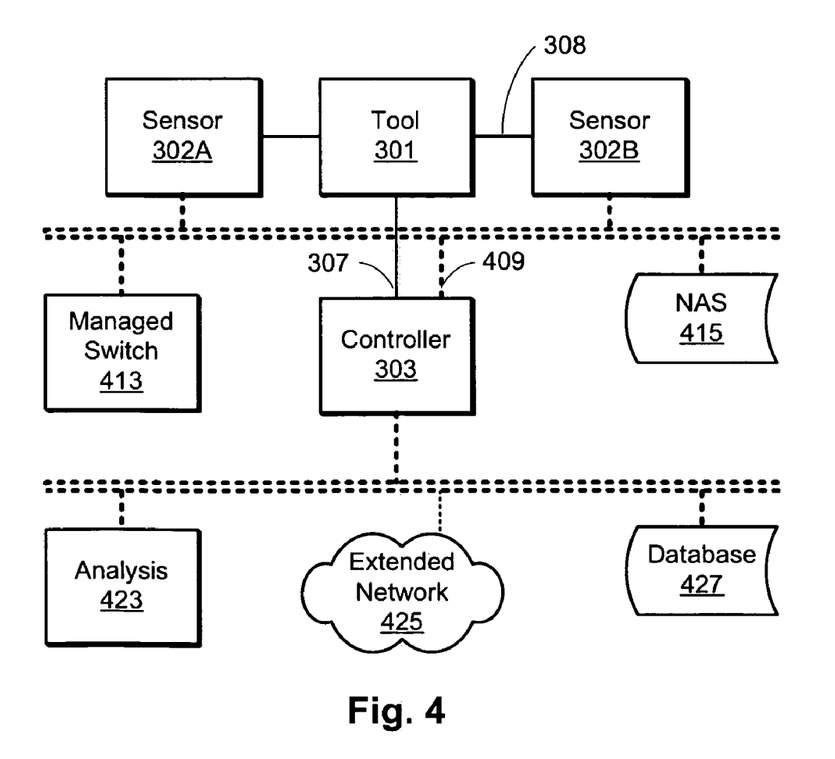
FIG. 4 illustrates using multiple types of communication channels.

FIG. 3 is a block diagram of a controller using a single type of communication channel to communicate with a tool, sensor, and tool host. FIG. 4 illustrates using multiple types of communication channels. In FIG. 3, a SECS dominated scenario is illustrated. The controller 303 uses a SECS protocol 307, 309 to communicate with both the tool 301 and the sensor 302. The connection 308 between the tool 301 and sensor 302 may involve any type of energy or force normally sensed, including any of the sensations identified in the discussion of FIG. 1. In FIG; 4, a more complex combination of SECS and network communications are illustrated. The only SECS communications channel 307 in this scenario is between the controller 303 and host 301. A tool side network 409 connects the controller with sensors 302A–B, managed switch 413 and network attached storage (NAS) 415. A fab side network 419 connects the controller 303 with analysis software 423 such as a traditional tool host or distributed processors, with an extended network 425 such as the Internet, a VPN or a dedicated internal network, and a database 427 that persists or stores data published by the controller. Alternatively, the database 427 could reside on the controller 303.

Introducing the Failsafe Switch to a Network

Figure 5:
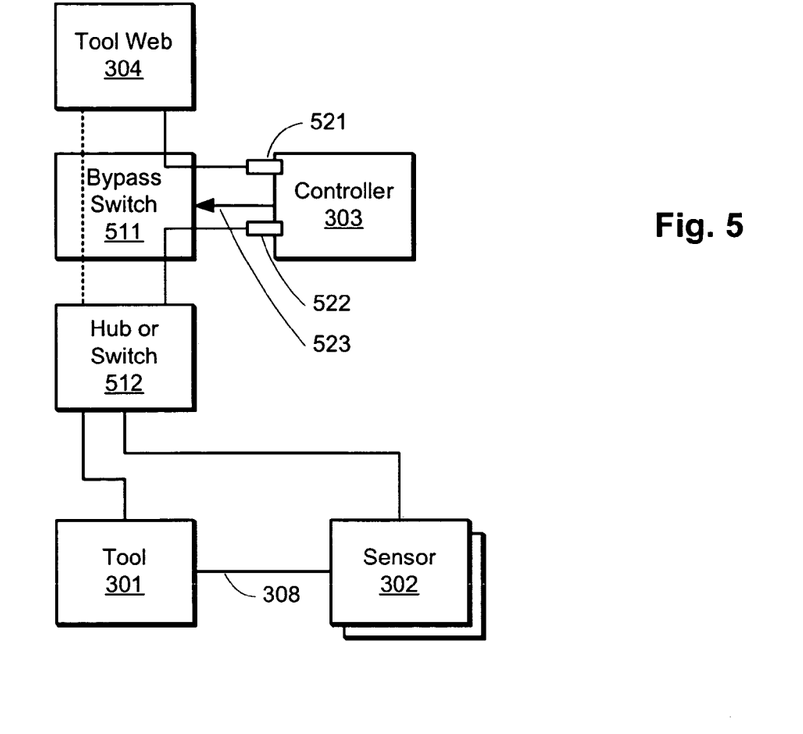
FIG. 5 is a block diagram of adding a failsafe switch to a network.

FIG. 5 is a block diagram of adding a failsafe switch to the network depicted in FIG. 3. Two new components are introduced, a bypass switch 511 and a hub or switch 512. In many configurations, only the bypass switch 511 will be new. This arrangement of the network assumes that communications with the tool is via a network protocol. This communications protocol can be arranged, if the tool does not already use a network protocol, by introducing a protocol adapter between the hub or switch 512 and the tool 501. Alternatively, two communication channels could be controlled by the bypass switch 511, for instance a serial connection carrying SECS traffic and an Ethernet connection carrying other traffic. As in FIG. 3, controller 303 communicates in normal operation mode with both the tool 301 and the sensor 302. The sensor is coupled to the tool to measure or record some aspect of tool condition or performance. Messages from tool web or host 304 are sent through the bypass switch 511 to the controller 303 and from the controller back through the bypass switch to the hub or switch 512. The hub or switch is a conventional network component that interconnects devices. The controller 303 includes at least two network interfaces 521, 522. These interfaces are effectively coupled through the bypass switch 511 in communication with the tool web 304 and the tool 301 or sensor 302. An additional connection 523 between the controller 303 and the bypass switch 511 carriers the heartbeat or other keep alive signal that keeps the bypass switch in normal (non-failsafe) mode, as described below. In this figure, two modes of operation are illustrated, normal operation of the controller with a solid line, and bypass operation with a dotted line. While two connections through the bypass switch appear in the figure, these may be logical modes of operation over a single wire or connection, not necessarily a pair of connections between by bypass switch 511 and either the tool web 304 or the hub or switch 512. Again, the bypass switch can control more than one connection.

Figure 6:
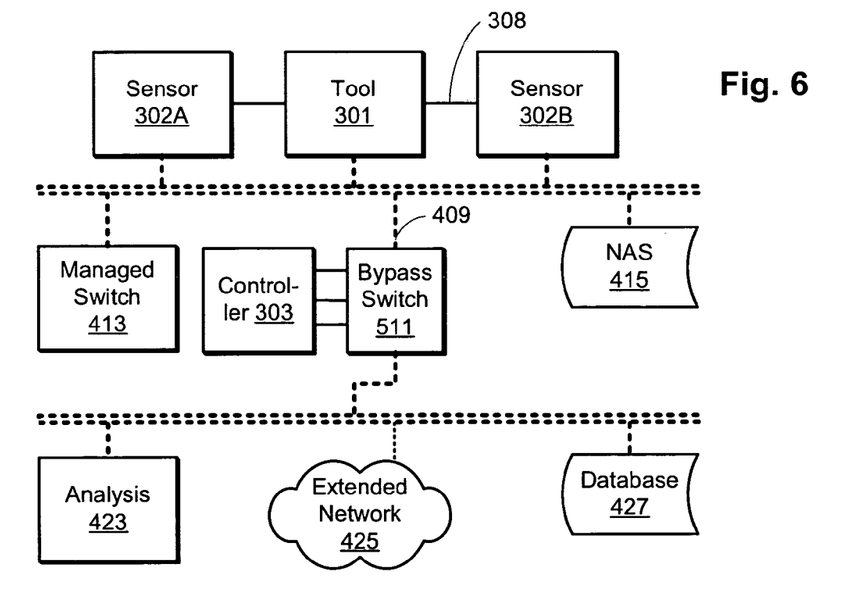
FIG. 6 is a block diagram of adding a failsafe switch to another network.

FIG. 6 is a block diagram of adding a failsafe switch to the network depicted in FIG. 4. In this figure, the hub or switch connected by 409 to the bypass switch 511 typically is implied by the multi-drop network connection from by bypass switch to the tool 301 and sensors 302A–B. Three connections between the bypass switch and the controller appear in this figure, as before.

Failsafe Operation

Returning to FIG. 5, we explain one embodiment of operation of the failsafe switch. In the case of a controller malfunction, so that the controller no longer serves a useful role between two devices that could communicate without an intermediate controller, connectivity is established directly between the devices, for instance, a host 304 and tool 301. In one embodiment, a switch with a simple embedded microcontroller is used. Shore Micro provides at least one switch that works. It includes a relay that makes a reassuring "click" when it switches. The microcontroller in the switch listens for a heartbeat signal from the controller, via a connection 523 such as serial, parallel, USB, Firewire, Ethernet or other. Other protocols than a heartbeat could be used, depending on the logic and resources provided at the failsafe switch. For instance, the failsafe switch could make periodic inquiries to the controller and respond to either error condition indications or response time-outs. These inquires could be regular or adaptive to some measure of high traffic, low traffic and/or other operating condition of interest. The microcontroller-controlled switch is analogous to a double pole double throw switch that cuts the controller 303 into or out of the circuit with the host 304. In normal mode, the controller is physically connected in the circuit. In failsafe mode, the host and tool/sensors are directly connected. Alternatively, electronic switching could be employed, giving up the reassuring click of a relay.

Software to implement a heartbeat and failsafe connection may include a device driver that sets packet addresses, a kernel hook for capturing packets when a network interface runs in promiscuous mode, a watch dog daemon, and a user space program. The description that follows is Linux oriented. Other operating systems could be used, such as BSD variants, Unix variants, or Windows. A system could be written to run on a virtual machine, such as a real time version of Java, so that only small changes to the software, to control low level networking functions, would be necessary to port the software from one operating system to another.

The device driver would hook to the TCP/IP stack and make the controller transparent, as if the controller were not connected. It does this by changing source addresses and information in packets to appear as if they are coming from the tool or the host, instead of the intermediate controller. The device driver copies data from user space to TCP/IP hooks in kernel space.

The controller may handle selected packets that are not addressed to an HSMS port without processing of those packets by the controller by bridging them from one network interface to the other. For instance, a ping or ICMP packet can be passed through without processing by the controller. This selective bridging can be keyed to packet type and/or port.

The kernel hook is a few lines of code that save at least certain packets when the network interface is running in a promiscuous mode, essentially sniffing packets that are not destined for the address at which the network interface appears. An unmodified Linux kernel, for instance 4.2.26, does not capture packets that are not addressed to it (layer 2, or MAC layer), despite running the interfaces in promiscuous mode. It dumps the content in the ip_rcv function. The kernel hook passes certain packets to a function not part of the unmodified kernel to be handled.

Watch dog daemons talk to the switch, sending out a heartbeat. The switch will failsafe the connection (switch the relay) if it does not hear the heartbeat from this daemon. The default connection after power up for the switch is failsafe. The heartbeat daemon writes to syslog.

A user space program sets up IP or other addresses the controller's own port and for first and second devices between which the controller sits, for instance a tool/sencor and a host.

In Linux, user scripts for configuration information and startup glue the other components together. The software is bundled with a sample configuration file. The configuration file contains the host IP, the tool IP, a time interval for triggering the watch daemon timer, a corn port number for the watch dog daemon communication with the failsafe switch, and an optional mode of for future enhancement. A startup script preferably runs, when implemented with Linux 4.2.26, after syslog and network and before easi. The script starts and stops daemon operation as is typical for startup scripts. It may be named, for instance, hsmsfsd start. The script might take a little longer that other scripts simply because it is discovering the MAC addresses of both the tool and the host and adding the appropriate routes if needed. For discovery to succeed, the first and second devices, for instance the tool and host, are connected to the controller at startup. Alternatively, predetermined IP addresses could be loaded and used without any discovery. The startup script also adds a route, to tell the TCP/IP stack how controller IP addresses relate to the network interfaces eth0 and eth1.

The simplest configuration into which a controller or other intermediate device is likely to be added includes a tool and a host. In this simple case, the tool and the host IP addresses are known and are in the configuration table. When the controller runs the hsmsfsd startup script, it launches the switch watchdog daemon. This daemon does not know anything about the rest of the failsafe mechanism but simply causes the switch (Shore Micro switch) to switch to the failsafe (host connected physically to tool), if the blue box does not keep sending heartbeats or commands for it to stay online.

As long as the controller is functioning normally, the switch stays online and connects the tool and the host through the blue box. The startup script may use a standard ARP protocol to establish the MAC addresses of the tool and host and update a local ARP table. More details regarding ARP protocols are explained by the following RFCs, ARP in general #826, PROXY ARP #1027, DHCP ARP #2131 and UNARP #1868. If either the host or the tool answers on the second network interface, e.g., eth1, a host route is added to the second interface with that IP address.

In this embodiment, the tool and the host are on the same network subnet, as are the controller network interfaces. The controller discovers or is configured to know which interface connects to the host and to the tool, so it can route messages. A default route for the TCP/IP stack would be used otherwise, which would not work, because all messages for the same network subnet, which includes both the host and tool, would be routed to the same the same network interface. The modules is loaded, then the application with the IP addresses acquired from the configuration file and the MAC addresses for those IP addresses are acquired from the local ARP table. Now the host and the tool are connected through the blue box. The blue box configuration under EMX setup is passive that will accept connection from the host and active to connect to the tool with the IP address of the tool. The passive and the active HSMS setup have to have the same port in common.

A table maintained by the device driver, which attaches to TCP/IP stack hooks in the kernel, will have an entry for the tool and another entry for the host. For the second device, e.g., tool/sensor, table entries may be:

| Entry Number | Sequence by the app |
|---|---|
| Protocol | 0x6 for TCP |
| Flags | 1 means the MAC address is valid |
| Destination MAC address | Taken from startup script |
| Destination IP address | Taken from the startup script |
| Destination Port | Taken from configuration |
| Source IP address | Unknown |
| Source port | Unknown |

For the first device, e.g., host, table entries may be:

| Entry Number | Sequence by the app |
|---|---|
| Protocol | 0x6 for TCP |
| Flags | 1 means the MAC address is valid |
| Destination MAC address | Taken from startup script |
| Destination IP address | Taken from the startup script |
| Destination Port | Unknown |
| Source IP address | Taken from configuration |
| Source port | Taken from configuration |

For TCP/IP, a unique connection is typically identified by a 4-tuple that consists of source IP, source port, destination IP, and destination port. This would make the connection universal in the network and unique—network protocols support only one connection using this 4-tuple. Also available is the so-called half association, which includes the destination IP and the port, wherein the port refers to the service and the IP is the machine to which the connection is made. For example, www.mksinst.com is port 80 and some IP address that the Domain Name Server would resolve from the name www.mksinst.com. For an ISP user, the server at the ISP's end would keep your IP and allocate a local port, which make up the unique 4-tuple. Whenever someone opens another window of the browser, another unique 4-tuple is created, with the same destination IP and port, the same source IP, a different source port allocated to satisfy the uniqueness requirement.

In practical operation, a host will, for instance, try to connect to the tool or sensor; the controller intercepts one or more messages from the host with its network interface operating in promiscuous mode. A first filter attached to an input hook is applied, which determines if the packet belongs to any of the network interfaces on controller. The first filter gives any packet that belongs to an interface to that interface and exits. If the packet does not belong to the controller's network interfaces, the filter looks up the destination port and IP in the device driver tables above. If the destination is found in the device driver tables, the filter changes the destination of the packet to a controller-related address and hands it off to the TCP/IP stack. After the packet is handled by the TCP/IP stack, a second filter attached to an output hook restores the destination, so that an acknowledgement or response will appear to come from the original destination. This process is sometimes called masquerading in. This approach supports concurrent sessions. Either the controller processes the packet directly or it relays the packet to its original destination, depending on the type of packet and the history of the session.

In practical operation, a tool/sensor may will try to connect to the host. The intermediate device, the controller will try to send the packet to the host. The IP send function looks up the destination packet and destination port. If the destination is found, the function modifies the packet source IP which is the controller IP to the tool IP in the table, copy destination port (which happens to be the source port of the controller) to the table. The tool will respond to the packet and the receive function will get the response. But, the table is complete now. Therefore lookup would succeed and redirect the packet to our stack. This process is sometimes called masquerading out.

Either the tool or the host will ask for their MAC address, when the ARP entries age. The tool for instance will ask for the MAC address of the host IP but the tool is not connected to the host, it connected to the controller. The controller looks up the host's IP address in its table entries and responds to the ARP request message with the appropriate MAC address for the host. This is the ARP hook in the device driver. The MAC address provided by the controller is the true MAC address of the host or, in response to an ARP request from the host, the true MAC address of the tool. The packet journey happens inside the module (hsmsfs.o device driver) that connects to the TCP/IP stack.

If for any reason the controller freezes or suffers system lockup, the failsafe function may be activated. As long as the serial switch daemon is running the system and the system seems healthy, the controller will remain online and the host and the tool will connect through the controller. If the daemon fails, the switch will default to failsafe and the host and the tool will directly connect to each other. Optionally, the daemon may evaluate the health of the controller's operation, predict or sense failure, and respond appropriately. In the case of predicted failure, the host may be notified and, optionally, the sensing of the controller health may be modified. When the failsafe switch is thrown, participants in the session that is now directly connected will retry or reestablish the connection from the host to the tool. When the connection is reestablished, failsafe operation is accomplished. In one embodiment of a mechanical relay, loss of power to the switch causes the relay to assume the failsafe setting and directly connect the host to the tool.

When a host loses a connection, it should attempt to restart a session. Because the ARP table is up to date, a direct connection is readily established. Restarting a session is sometimes referred to as robust messaging.

This embodiment of failsafe has a number of interesting characteristics, some of which are shared by alternate embodiments. No software needs to be added to the first of second device (host or tool). The host and tool are on the same subnet, so that they will be able to communicate in case of a failsafe direct connection. The intermediate device or controller is on the same subnet as the tool and host. The host and tool could "see each other" if the controller were started up in failsafe mode. An active session would automatically be retried by the tool, host or both, when operation switches over from normal mode to failsafe mode.

Second Operating Embodiment

In a second embodiment, selective bridging is implemented without the controller responding to ARP request messages between the host and the tool. ARP messages and other selected messages destined from the host to the tool or vice-a-versa are bridged from one side of the controller to the other, passed from one network interface operating in promiscuous mode to another network interface and retransmitted. The tool responds to forwarded ARP request messages from the host and vice-a-versa. The controller selectively bridges and forwards the ARP request messages and other messages with a recognized source and destination, for instance, based on a table look-up. A useful table is described above. bridging is selective. A packet with an unrecognized destination is not handled by the kernel hook, but allowed to pass through the ordinary TCP/IP stack process, which then might drop the packet. Filtering out certain messages reduces cycles on the network. For instance, if the host is connected through five controllers to five tools, the first controller can safely filter out some or all of the messages directed to the second through fifth tools. The traffic on the tool side network can be substantially reduced. As another example, the controller may be retrieving and storing data from the tool that the host is expected or has the option to request, but has not yet requested. The controller can safely filter out data traffic bound for the controller and reduce traffic on the host side network. One rule that may be applied for selective bridging is to forward only packets with both host and destination that are recognized by and in communication with the controller. In addition, selected types of broadcast messages can be bridged. The kernel hooks described above are adapted to provide the needed support for passing packets between network interfaces and for bridging packets.

In handling packets, priority is given to the HSMS configured port, so that connection is handled by the local process on the blue box. ICMP, UDP, ARP, TCP (ports other than HSMS) packets are forwarded between the two network interfaces, provided that the destination IP is in the local table. Thus behavior is similar to a bridge, but selectively restricted to the IP addresses in the table to avoid cycles in the network. ARP restriction is even more stringent, both the source and the target IP have to be in the table before they get forwarded, which means only the tool and the host can ARP each other across the controller's network interfaces.

Third Operating Embodiment

Alternatively, the controller or intermediate device may assume the IP addresses of the devices that could communicate directly, and repackage and relay packets as appropriate. This approach is much different from the traditional functions of other type of devices, because the controller's network interface has its own hardware layer identifier or MAC address. A MAC address is part of the packet addressing scheme typically implemented for networks. For a typical network interface, the network layer (e.g., IP) is linked to the data link layer (e.g., MAC), as designated in the seven layer OSI model. Network protocols, for instance ARP, allow devices on the network to correlate IP and MAC addresses. Date redundancy features of packet transport include check codes that are encoded using, in part, information from the data link layer of the packet. When two network interfaces, for instance connected to separate network segments, both use the same IP address, they nonetheless have distinct MAC addresses. For the controller to relay a packet from the host to the tool, or vice-a-versa, when the controller is borrowing the tool's IP address identity, it must repackage the packet with corrected check codes that are encoded using the MAC address of the tool, instead of the MAC address of the controller. This is not quite sufficient for failsafe implementation, however. The devices that could communicate directly must update their network layer to data link layer tables, e.g., their ARP tables, so as to correct the effective MAC address after fail over. When the failsafe switch described above connects the host and tool directly, in failsafe mode, packets will not flow directly from the host to tool, because the MAC addresses that the host and tool have for each other include MAC addresses of the controller. To overcome this, at least one of the host or tool must update its network layer to data link layer tables. The host, tool or both may be adapted to frequent updating of their tables or may be adapted to respond to a dropped session by updating their tables. With an updated table, a broken session can be reestablished or a new, direct session begun.

Further Discussion of Embodiments

The present invention may be practiced as a method or device adapted to practice the method. The same method can be viewed from the perspective of a smart sensor or adapter, such as SenseLink, or from the perspective of a controller, such as Blue Box. The invention may be an article of manufacture such as media impressed with logic to carry out computer-assisted sensor control.

The first method embodiment is a method of transparently establishing a direct connection between first and second devices, in case of failure of an intermediate device. This method includes connecting the first and second devices to first and second network interfaces of an intermediate device. The first and second network interfaces have data link layer identifiers that are distinct from those associated with the first and second devices. In a normal operating mode, the method further includes handling messages addressed between the first and second devices, while the intermediate device repeatedly signals to a failsafe switch its continuing healthy operation. At the failsafe switch, upon interruption of the repeated signals of healthy operation from the intermediate device, the method includes switching to a failsafe mode by directly connecting the first and second devices with a data connection that bypasses the intermediate device. This data connection may bypass the first and second network interfaces. The repeated signals of healthy operation may be a continuous circuit or discrete periodic signals.

One aspect of the first embodiment is that switching to a failsafe mode may be make an audible signal, such as a relay click. According to another aspect, the first and second network interfaces may be adapted to pass all packets received to a filter that handles packets addressed to the first or second device or to the intermediate device. Handling of packets may include, for at least some packets, relaying the packets from the first or second device to the second or first device and specifying in a source identification field of the relayed packets a data link layer identifier of the actual source, instead of a data link identifier of the first or second network interface.

A further aspect is how the repeatedly signaling is implemented. It may be implemented by a daemon running on the intermediate device that repeatedly sends a message the failsafe switch or that listens for and responds to inquiries from the failsafe switch. Alternatively, the daemon could control a continuous circuit.

Embodiments further may include multiple second devices responsive to the first device, using either one physical communications link or two or more physical communications links. Where two or more physical communications links are used, one may be an Ethernet segment and the other a serial connection. The serial connection may be compliant with an IEEE standard, such as RS-232, or RS 422.

In operation, establishing a direct communications session between the first and second devices may not require updating in either the first or second devices any tables that correlate network addresses to data link layer addresses. That is, ARP tables may not need be updated. It may be a necessary update any tables that correlate IP and MAC addresses. The first and second devices and the intermediate devices all may operate within the same network subnet.

Another method embodiment is a failover method of establishing a communications link between a host and tool after failure of an intelligent controller coupled between the host and the tool. This method includes adopting at a first port of the intelligent controller a first hardware level identifier otherwise used by the tool and advertising the first port to the host as being addressed using the first hardware level identifier. The method further includes adopting at a second port of the intelligent controller a second hardware level identifier otherwise used by the host and advertising the second port to the tool is being addressed using the second hardware level identifier. The method further includes intercepting at the intelligent controller advertisements of the first and second hardware level identifiers, so that the host and the tool or not a direct advertising communication. In operation, the intelligent controller repeatedly signals a failsafe switch that the controller should be relied upon. The failsafe switch is adapted upon failure of the repeated signaling to directly connect the host and the tool with a communications link that bypasses the intelligent controller. Thereafter, the host and tool are in direct advertising connection and the advertisements of the first and second hardware level identifiers facilitate establishment of a communications link between the host and the tool.

Several aspects of this other embodiment are described. According to one aspect, a first logical address identifying the first port, a second logical address used by the tool, a third logical address identifying the second port and a fourth logical address used by the host all may be different. These logical addresses may be IP addresses or other network layer addresses. The hardware level identifier may be a MAC address. Advertisements of the hardware level identifier is may be standard compliant ARP messages.

The other embodiment further may be applied to a sensor that monitors the tool, wherein the intelligent controller is coupled between the host and the sensor. This application may include adopting at the first port of the intelligent controller a third hardware level identifier otherwise used by the sensor and advertising the first port to the host as being addressed using the third hardware level identifier. It further may include advertising the second port the sensor as being addressed using the second hardware level identifier and intercepting at the intelligent controller advertisements of the third hardware level identifier, so that the host and sensor are not in direct advertising communication. According to this application, the failsafe switch upon failure of the repeated signaling establishes a direct communications link between the host and the sensor that bypasses the intelligent controller. This direct connection may bypass the first and second ports. The aspects of distinct logical IP address, distinct network layer address, hardware identifier and ARP standard compliance may all be adapted to this application.

A further method embodiment introduces a failover protected intelligent controller and switch to a communications link between a host and at least one tool or sensor. This method includes coupling the switch to the host, the intelligent controller and the tool, wherein the host and tool communicate with the intelligent controller and not directly with each other when the switch is a first state; host and tool communicate directly with each other when the switch is in a second state. In the first state, the intelligent controller intercepts messages between the host and tool, modifies at least one hardware level source identifier and at least one hardware level destination identifier in the intercepted message, modifies at least one error correction code in intercepted message to correspond to the modified hardware level identifiers and relays the intercepted messages with the modified hardware level identifiers and modified correction code. In the second state, the switch bypasses the intelligent controller, establishing direct communications between the host and tool.

In one aspect of the further method embodiment, the intelligent controller includes at least a first port and a second port, the first port coupled in communication with the host and the second port coupled in communication with the tool. In this aspect, a first logical address identifies the first port, a second logical address is used by the tool, a third logical address identifies the second port and a fourth logical address is used by the host. These for logical addresses are all different. They may be IP addresses or other network layer addresses. The hardware level identifiers of the further method embodiment may be MAC addresses.

The further method embodiment also may be applied to a sensor that monitors the tool. This further application includes coupling the failsafe switch to the sensor, wherein the host and sensor communicate with the intelligent controller and not directly with each other when the failsafe switch is in the first state; the host and the sensor communicate directly with each other when the failsafe switch is in the second state. In the first state, the intelligent controller operates on messages between the host and sensor as described above for the host and tool. In the second state, the failsafe switch bypasses the intelligent controller and the host communicates directly with the sensor. Other aspects of the further embodiment be be applied to host, tool, and sensor communications.

The intelligent controller may include multiple ports for attachment to the tool and sensor, with logical addresses of the ports, the host, tool and sensor all being distinct. As above, these logical addresses may be IP addresses or network level identifiers.

All of the methods described above may be practiced as an intermediate device with failsafe switch adapted to establish direct connection between the first and second devices, in case of failure of the intermediate device. One embodiment includes an intermediate device having first and second network interfaces that can be linked in communication with the first and second devices, respectively, the first and second network interfaces having data link layer identifiers that are distinct from any data link layer identifiers associated with the first or second devices. It further includes a failsafe switch in communication with the intermediate device and contingently linked in communication with the first and second devices. The failsafe switch has at least two modes, normal and failsafe operation modes. In normal operation mode, the failsafe switch connects the first and second devices with the first and second network interfaces. In failsafe mode, the switch directly connects the first and second devices, bypassing the intermediate device. This connection may be electrical or through an isolator. The intermediate device further includes logic and resources adapted to repeatedly communicate healthy operation signals to the failsafe switch. The failsafe switch further includes logic and resources adapted to respond interruption of the repeated signals of healthy operation by switching to a failsafe mode.

One aspect of device may be that switching to the failsafe mode includes making inaudible signal, such as the click of a relay. The intermediate device may further include in its logic and resources a filter that retains for handling packets addressed to the first or second device or to the intermediate device, the filter being coupled to the first and second network interfaces. This filter allows the network interfaces to operate on a promiscuous mode. The logic and resources implementing the filter may reside on a processor in the intermediate device or close to or on the network interfaces of the intermediate device. Another aspect is that the logic and resources of the intermediate device further include demon that signals the failsafe switch. This demon may function in any of the modes described in the methods above.

While the present invention is disclosed by reference to the preferred embodiments and examples detailed above, it is understood that these examples are intended in an illustrative rather than in a limiting sense. Computer-assisted processing is implicated in the described embodiments. Accordingly, the present invention may be embodied in methods for computer-assisted sensing, systems including logic to carry out sensor control, systems that take advantage of computer-assisted sensor control, media impressed with logic to carry out computer-assisted sensor control, data streams impressed with logic to carry out computer-assisted sensor control, or computer-accessible services that carry out computer-assisted sensor control. It is contemplated that modifications and combinations will readily occur to those skilled in the art, which modifications and combinations will be within the spirit of the invention and the scope of the following claims.

We claim as follows:

1. A method of transparently establishing connection between first and second devices, in case of failure of an intermediate device, the method including:
   connecting the first and second devices to first and second network interfaces of an intermediate device, the first and second network interfaces having data link layer identifiers that are distinct from those associated with the first or second devices;
   in a normal operating mode, handling the intermediate device messages addressed between the first and second devices, wherein the messages handled appear to an other of the devices to have come from a one of the devices, such that switching to a failsafe mode allows a network session between the one device and the other device to continue without needing to be restarted, while the intermediate device repeatedly signals to a failsafe switch its continuing healthy operation; and
   at the failsafe switch, upon interruption of the repeated signals of healthy operation from the intermediate device, switching to the failsafe mode by directly connecting the first and second devices with a data connection that bypasses the intermediate device.

2. The method of claim 1, wherein switching the failsafe switch to failsafe mode includes making an audible signal.

3. The method of claim 2, wherein the audible signal is a relay click.

4. The method of claim 1, wherein the first and second network interfaces are adapted to pass all packets received to a filter that retains for processing packets addressed to the intermediate device.

5. The method of claim 1, wherein the handling of packets includes, for at least some packets, relaying the packets from the first or second device to the second or first device and specifying in a source identification field of the relayed packets a data link layer identifier of the actual source, instead of a data link identifier of the first or second network interface.

6. The method of claim 1, wherein repeatedly signaling continuing health is implemented by a daemon running on the intermediate device that sends a message to the failsafe switch.

7. The method of claim 1, wherein repeatedly signaling continuing health is implemented by a daemon running on the intermediate device that listens for and responds to inquiries from the failsafe switch.

8. The method of claim 1, further including a plurality of second devices connecting to the first device using a single physical communications links.

9. The method of claim 8, wherein the single physical communications link is an Ethernet segment.

10. The method of claim 1, further including a plurality of second devices connecting to the first device using a two or more physical communications links.

11. The method of claim 10, wherein one of the physical communications links is an Ethernet segment and another is a serial connection.

12. The method of claim 11, wherein the serial connection complies with an RS-232 or RS-422 standard.

13. The method of claim 1, wherein establishing a direct communications session between the first and second devices does not require updating in the first or second devices any tables correlating network addresses and data link layer addresses.

14. The method of claim 1, wherein network addresses of the first and second devices and the intermediate device all are within the same network subnet.

15. The method of claim 1, wherein establishing a direct communications session between the first and second devices does not require updating in the first or second devices any tables correlating IP and MAC addresses.

16. A fail-over method of establishing a communications link between a host and a tool after failure of an intelligent controller coupled between the host and the tool, the method including:
   adopting at a first port of the intelligent controller a first hardware-level identifier otherwise used by the tool and advertising the first port to the host as being addressed using the first hardware-level identifier;
   adopting at a second port of the intelligent controller a second hardware-level identifier otherwise used by the host and advertising the second port to the tool as being addressed using the second hardware-level identifier;
   intercepting at the intelligent controller advertisements of the first and second hardware-level identifiers, so that the host and the tool are not in direct advertising communication;
   repeatedly signaling a failsafe switch that the intelligent controller should be relied upon, wherein the failsafe switch is adapted upon failure of the repeated signaling to directly connect the host and the tool with a communications link that bypasses the intelligent controller, whereby the host and the tool are in direct advertising communication and the advertisements of the first and second hardware-level identifiers facilitate establishment of the communications link between the host and the tool.

17. The method of claim 16, wherein a first logical IP address identifying the first port, a second logical IP address used by the tool, a third logical IP address identifying the second port and a fourth logical IP address used by the host are all different.

18. The method of claim 16, wherein a first logical network-layer address identifying the first port, a second logical network-layer address used by the tool, a third logical network-layer address identifying the second port and a fourth logical network-layer address used by the host are all different.

19. The method of claim 16, wherein the hardware-level identifier is a MAC address.

20. The method of claim 16, wherein the advertisements of the hardware-level identifiers are by standard-compliant ARP messages.

21. The method of claim 16, further applied to a sensor that monitors the tool, wherein the intelligent controller is coupled between the host and the sensor, the method further including:
 adopting at the first port of the intelligent controller a third hardware-level identifier otherwise used by the sensor and advertising the first port to the host as being addressed using the third hardware-level identifier;
 advertising the second port to the sensor as being addressed using the second hardware-level identifier; and
 intercepting at the intelligent controller advertisements of the third hardware-level identifier, so that the host and the sensor are not in direct advertising communication;
 wherein the failsafe switch upon failure of the repeated signaling establishes a direct communications link between the host and the sensor that bypasses the intelligent controller.

22. The method of claim 21, wherein a first logical IP address identifying the first port, a second logical IP address used by the tool, a third logical IP address identifying the second port, a fourth logical IP address used by the host and a fifth logical IP address used by the sensor are all different.

23. The method of claim 21, wherein a first logical network-layer address identifying the first port, a second logical network-layer address used by the tool, a third logical network-layer address identifying the second port, a fourth logical network-layer address used by the host and a fifth logical network-layer address used by the sensor are all different.

24. The method of claim 21, wherein the hardware-level identifier is a MAC address.

25. The method of claim 21, wherein the advertisements of the hardware-level identifiers are by standard-compliant ARP messages.

26. A method of introducing a fail-over protected intelligent controller and switch into a communications link between a host coupled to at least one tool, the method including:
 coupling the switch to the host, the intelligent controller and the tool, wherein the host and the tool communicate with the intelligent controller and not directly with each other when the switch is in a first state and the host and the tool communicate directly with each other when the switch is in a second state;
 in the first state, the intelligent controller
  intercepting messages between the host and tool,
  modifying at least one hardware-level source identifier and at least one hardware-level destination identifier in the intercepted messages,
  modifying at least one error correction code in the intercepted messages to correspond to the modified hardware-level identifiers, and
  relaying the intercepted messages with the modified hardware-level identifiers and the modified correction code; and
 in the second state, the switch bypassing the intelligent controller, whereby the host communicates directly with the tool.

27. The method of claim 26, wherein
 the intelligent controller includes at least a first port and a second port, the first port coupled in communication with the host and the second port coupled in communication with the tool; and
 a first logical IP address identifying the first port, a second logical IP address used by the tool, a third logical IP address identifying the second port and a fourth logical IP address used by the host are all different.

28. The method of claim 26, wherein
 the intelligent controller includes at least a first port and a second port, the first port coupled through the switch in communication with the host and the second port coupled through the switch in communication with the tool; and
 a first logical network-layer address identifying the first port, a second logical network-layer address used by the tool, a third logical network-layer address identifying the second port and a fourth logical network-layer address used by the host are all different.

29. The method of claim 26, wherein the hardware-level identifier is a MAC address.

30. The method of claim 26, further applied to at least one sensor that monitors the tool, the method further including:
 coupling the failsafe switch to the sensor, wherein the host and sensor communicate with the intelligent controller and not directly with each other when the failsafe switch is in the first state and the host and the sensor communicate directly with each other when the failsafe switch is in the second state;
 in the first state, the intelligent controller
  intercepting messages between the host and sensor,
  modifying at least one hardware-level source identifier and at least one hardware-level destination identifier in the intercepted messages,
  modifying at least one error correction code in the intercepted messages to correspond to the modified hardware-level identifiers, and
  relaying the intercepted messages with the modified hardware-level identifiers and the modified correction code; and
 in the second state, the failsafe switch bypassing the intelligent controller, whereby the host communicates directly with the sensor.

31. The method of claim 30, wherein
 the intelligent controller includes at least a first port and a second port, the first port coupled through the failsafe switch in communication with the host and the second port coupled through the failsafe switch in communication with the tool and the sensor; and a first logical IP address identifying the first port, a second logical IP address used by the tool, a third logical IP address identifying the second port, a fourth logical IP address used by the host and a fifth logical IP address used by the sensor are all different.

32. The method of claim 30, wherein
the intelligent controller includes at least a first port and a second port, the first port coupled through the failsafe switch in communication with the host and the second port coupled through the failsafe switch in communication with the tool and the sensor; and
a first logical network-layer address identifying the first port, a second logical network-layer address used by the tool, a third logical network-layer address identifying the second port, a fourth logical network-layer address used by the host and a fifth logical network-layer address used by the sensor are all different.

33. The method of claim 30, wherein
the intelligent controller includes at least a first port, a second port and a third, the first port coupled through the failsafe switch in communication with the host, the second port coupled through the failsafe switch in communication with the tool and the third port coupled through the failsafe switch in communication with the sensor; and
a first logical IP address identifying the first port, a second logical IP address used by the tool, a third logical IP address identifying the second port, a fourth logical IP address used by the host and a fifth logical IP address used by the sensor are all different.

34. The method of claim 30, wherein
the intelligent controller includes at least a first port, a second port and a third, the first port coupled through the failsafe switch in communication with the host, the second port coupled through the failsafe switch in communication with the tool and the third port coupled through the failsafe switch in communication with the sensor; and
a first logical network-layer address identifying the first port, a second logical network-layer address used by the tool, a third logical network-layer address identifying the second port, a fourth logical network-layer address used by the host and a fifth logical network-layer address used by the sensor are all different.

35. An intermediate device with failsafe switch adapted to assure direct connection between first and second devices, in case of failure of an intermediate device, the method including:
an intermediate device having first and second network interfaces that are linked in communication with the first and second devices, respectively, the first and second network interfaces having data link layer identifiers that are distinct from any data link layers identifiers associated with the first or second devices;
a failsafe switch in communication with the intermediate device and contingently linked in communication with the first and second devices, wherein the failsafe switch is adapted to a normal operation mode in which the first and second devices communicate with the first and second network interfaces and a failsafe operation mode in which the first and second devices communicate directly, bypassing the intermediate device;
logic and resources on the intermediate device adapted to
receive packets on one of the network interfaces that are from one of the devices,
relay the packets on an other of the network interfaces to an other of the devices, and
repeatedly communicate healthy operation of the intermediate device to the failsafe switch;
logic and resources on the failsafe switch adapted to respond to interruption of the repeated signals of healthy operation from the intermediate device by switching to a failsafe mode;
wherein the relayed packets appear to the other device to have come from the one device, such that the switching to the failsafe mode allows a network session between the one device and the other device to continue without needing to be restarted.

36. The intermediate device and failsafe switch of claim 35, wherein switching the failsafe switch to failsafe mode further includes making an audible signal.

37. The intermediate device with failsafe switch of claim 36, wherein the audible signal is a relay click.

38. The intermediate device with failsafe switch of claim 35, wherein the logic and resources of the intermediate device further include a filter that retains for processing packets addressed to the intermediate device, the filter being coupled to the first and second network interfaces.

39. The intermediate device with failsafe switch of claim 35, wherein the logic and resources of the intermediate device further include a daemon running on the intermediate device that sends a message to the failsafe switch.

40. The intermediate device with failsafe switch of claim 35, wherein the logic and resources of the intermediate device further include a daemon running on the intermediate device that listens for and responds to inquiries from the failsafe switch.

* * * * *